Figure 1:
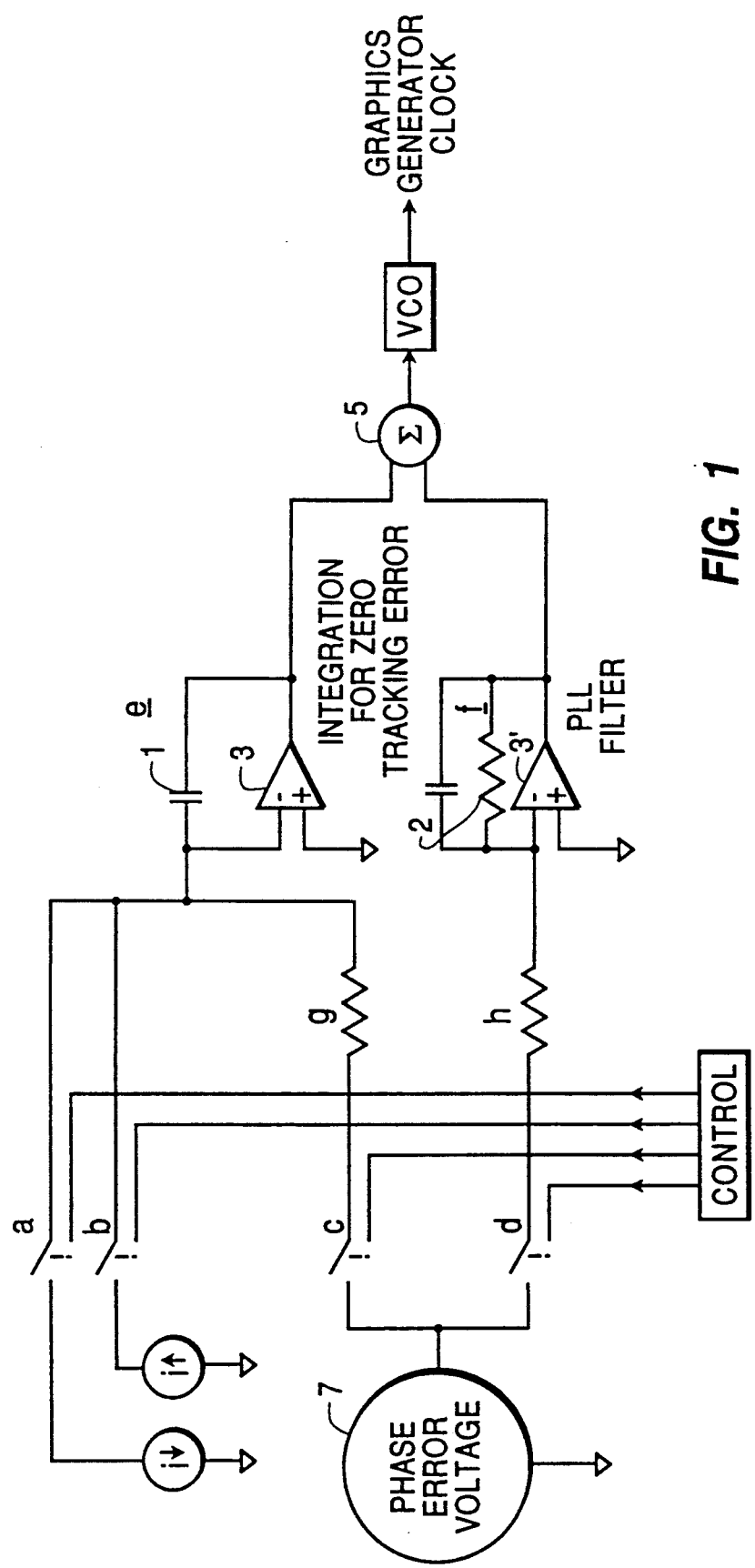

United States Patent [19]

Roberts

[11] Patent Number: 5,060,066
[45] Date of Patent: Oct. 22, 1991

[54] INTEGRATING-PHASE LOCK METHOD AND CIRCUIT FOR SYNCHRONIZING OVERLAY DISPLAYS ON CATHODE-RAY-TUBE MONITORS OF DIGITAL GRAPHIC INFORMATION AND VIDEO IMAGE INFORMATION AND THE LIKE

[75] Inventor: Jerry B. Roberts, Lexington, Mass.
[73] Assignee: Visage, Inc., Framingham, Mass.
[21] Appl. No.: 313,388
[22] Filed: Feb. 21, 1989
[51] Int. Cl.$^5$ .............................................. H04W 5/04
[52] U.S. Cl. ..................................... 358/148; 358/158
[58] Field of Search ...................... 358/148, 158, 183; 331/17, 20; 340/825

[56] References Cited

U.S. PATENT DOCUMENTS 4,093,963 6/1978 Uchida .................................. 358/159

FOREIGN PATENT DOCUMENTS 0224571 10/1986 Japan .

OTHER PUBLICATIONS

Visage–A Clear Path to the Future of Interactive Multimedia Information Systems, 1988.
Visage–Interactive Video Upgrade Delivery Systems.

Primary Examiner—James J. Groody
Assistant Examiner—David E. Harvey
Attorney, Agent, or Firm—Rines & Rines

[57] ABSTRACT

A novel separate synchronizing error signal integrating filter section and error signal phase lock loop section independently controllable for such purposes as controlling the horizontal synchronization of overlayed video and graphic display rasters, particularly during periods of aberrant operation.

10 Claims, 3 Drawing Sheets

INTEGRATING-PHASE LOCK METHOD AND CIRCUIT FOR SYNCHRONIZING OVERLAY DISPLAYS ON CATHODE-RAY-TUBE MONITORS OF DIGITAL GRAPHIC INFORMATION AND VIDEO IMAGE INFORMATION AND THE LIKE

The present invention, while relating to the presentation of overlaid graphic and video displays on cathoderay-tube monitor screens and the like, is more particularly concerned with horizontal synchronizing problems arising under special situations, such as in the presentation of still frames from video disc or similar video sources where it is difficult to synchronize during the phase instabilities in the vertical interval or otherwise to ignore or recover from synch output deviations or aberrations that otherwise present undesirable flagging or overscan at the top of a video-graphic data overlay display.

In the provision of interactive multimedia information systems, computer cathode-ray-tube screens may display software-controlled graphics as an overlay on video disc-provided video rasters as described, for example, in 1988 bulletins of the assignee of the present application entitled "Visage-A Clear Path To The Future Of Interactive Multimedia Information Systems" and "Interactive Video Upgrade Delivery Systems" and the equipments therein described. For such overlay applications, a limitation in attaining higher resolution graphics resides in the limit of 483 active video horizontal scan lines available in the standard American television raster.

Many of these lines would not normally show on a television tube, being lost off the top and bottom. With the current VGA standards which include graphics of 480 vertically stacked scan lines, in order to be able to show the entire graphics field in a straightforward way overlaid upon a video raster, it becomes necessary to show all the video frame in the active display area of the tube so as to avoid distorting the aspect ratio of the video image. It is therefore necessary to show the entire horizontal range of the video shrunk down to the viewing range, also. Thus, unlike television presentations, the absolute vertical limit edges of the active video field now appear on the active area of the cathode-ray-tube face or screen. In prior products, there has been no attempt to make the edges of the graphics field align absolutely precisely with the edges of the video field. The resulting effect is to expose the ragged and very unappealing-looking vertical edges of the video frame field or raster. The approach of this invention, however, is to use the active area of the graphics raster, 480 lines vertically (very few—three—lines less than the video) in the vertical with an appropriate horizontal dot clock of a one-to-one ratio.

The present invention is concerned with improvement in the horizontal synchronization techniques for such applications which can obviate the before-described flagging at the top of the display and, moreover, are particularly useful when digital television type chip sets, such as the ITT Type 2000, are used with their inherent hereinafter-explained short comings or defects in this regard—the general function here-addressed being that of establishing a clock frequency to be supplied to the digital graphics information which will cause the emerging graphics to be in perfect synchronization in at all times and under all circumstances with the available video information.

The conventional method of effecting horizontal synchronization in such and similar systems is to generate the signal from a phase-lock loop by phase comparison between the horizontal synch pulses coming from the graphics device and from the video source. Elementary phase lock loop techniques do not, however, provide optimum performance in these systems particularly when the use of VGA high resolution graphics is involved and the use of progressive scan frequency-doubled video to be compatible for overlay with the VGA output, with the corresponding need to show underscanned video to match the raster requirements of the graphics, as before-mentioned, and in which instances the performance limitations of the earlier techniques have become much more visible to the user. Specifically, the combination of difficulties that is most acute arises from the need to show the entire 480 lines of active video and the fact that the only practical source at this time for cost effective product from that video is through the use of the previously mentioned progressive scan type chip sets such as the ITT Digit 2000. These particular chip sets have the defect or limitation that horizontal synchronization is not maintained during the vertical interval when the chip set is operated in the mode necessary for the vast majority of the applications to which the equipment is to be applied. In particular, the use of video discs as sources of video and the use of still frames precludes satisfactory operation of such chip sets in what is known as color-lock mode, without great difficulty and considerable extra circuitry. In the non-color lock mode, the output from the chip set causes a failure to synchronize during the equalization pulses of the vertical interval, which horizontal sync level pulses occur at double rates, half the width, and sometimes different polarity than during the rest of the video standard. This causes deviations of up to a couple of microseconds in the synch time output by the ITT chip set, and the synchronization method used in the overlay circuitry has to be able either to ignore this or recover from it very rapidly in order to be able to present an accurate unflagged overlay as with the first lines of video on the screen. Thus, the phase-lock loop requirements of this application are of somewhat greater stringency than most phase lock loops, being concerned with more than just matching frequency without phase drift between two sources-with the phase offset condition of lock being usually not required to be specified with great precision in typical phase lock loop applications. Such, however, is decidedly not the case with video overlay wherein the two horizontals must be quite close to each other for a reasonable presentation of the graphics; and if the graphics are being used to circle or point out or highlight items in the video, often fairly precise alignment is required, demanding a phase lock loop of great accuracy that has as close to zero tracking error as possible. If there are drifts in the components free running that would change the free running frequency of the oscillator, these would normally be associated with a shift in the position of the raster absent such a provision for zero tracking error. Furthermore, the dynamic requirements are fairly particular inasmuch as standard techniques used by video disc players for presenting still frames require the successive fields to be offset by 140 nanoseconds from the expected time to avoid phase discontinuities in the color sub-carrier. Instead, this introduces a phase discontinuity into the horizontal sync which most monitors will accommodate. If the phase lock loops are not designed with a knowledge of this difficulty, there will be a shaking or flagging of the still frame video at the top of the frame, as before described, and this in turn makes the existing problem mentioned before with the Digit 2000 type chip sets worse, because the elimination of that 140 nanosecond jitter depends on the amount of time the phase lock loop has to settle in on stable horizontal from the video source.

The present invention, accordingly, provides significant improvements that obviate these difficulties and limitations including, first, providing a phase lock loop filter which has built-in integration providing for zero tracking error; and secondly, splitting the phase filter into two separate components driven by two different error signals which are then summed after the result, allowing separate control to the integrating part or path and to the ordinary loop filter part or path.

This allows the achievement of several advantages that are not otherwise readily attainable. In particular, the zero-tracking integrator may be turned off (disconnected from the error signals) during the vertical interval when the aberrant gyrations are occurring. It is the long time constant part which takes the long time to settle and it is now allowed simply to freewheel during the interval in question. The 140 nanosecond offset which should be settled quickly is indeed a pure phase error; and by leaving the phase part of the loop operative, the 140 nanosecond at the top of the screen has been tracked and in effect locked in place by switching the integrator back in for the rest of the interval. This is also most useful if it is desired to have scan lines additional to the before-described 480 lines and wherein, during the additional lines, one can switch out both inputs to the loop in a discretionary manner to allow freewheeling through that period, also.

Still an additional advantage of the separation of the integrating zero-tracking function which can be thought of as a frequency lock loop, as distinct from the phase lock aspect, has to do with speed of acquisition. This is particularly important where the graphics product that is used with many applications will change its graphic mode requiring different numbers of horizontal dots in a scan line which still takes the same amount of time. That requires, however, that the phase lock loop change its oscillating frequency to provide the appropriate dot clock. When that change occurs, there is initially a quickly building phase error due to the difference in frequencies established on the divide module as the graphics generator is changed. The requirement for agility in reacquiring the correct frequency is not just to obtain lock, but to obtain stably and accurately aligned display. The major problem in terms of timing resides in the time it takes to get the frequency, the zero tracking point on the integrator, correct. The integrator time constant thus needs to be fairly long for loop stability reasons; and by separating it from the phase loop, in accordance with the invention, it becomes possible to slew the integrator with a full-on current in a circuit that has detected that there is substantial frequency or phase error.

Initially, let it be supposed that there is a loss of frequency lock. A conventional frequency measuring circuit within the apparatus determines the direction of the frequency error and slews the zero point, which basically is a free-running frequency control in the correct direction at the maximum possible speed. Partway through this process, the phase loop, which is still operative, will acquire a phase lock. If integration took place as a single loop filter in the more conventional way, there would really be nothing further that could be done. The frequencies are perfectly locked and there would be no knowledge of the requirement to slew based on frequency error, and no meaningful phase error information would be available so long as slew is on. Thus, without slew, the system merely sits for a very long time until the integrator settles back out, with the user seeing the overlay slide sideways over a period of time until it lines up again accurately. With the division of the two circuit paths underlying the invention, on the other hand, it is possible to continue to drive the integrator at maximum slew without upsetting the functioning of the phase detector by simply sensing the continued presence of phase error until the phase error reverses direction, and then shutting off the slew mode so as to continue a linear ramp which extinguishes all the error on the integrator very quickly and thus achieves a very fast settling.

An object of the present invention, accordingly, is to provide a new and improved integrating-phase lock method and circuit for maintaining the horizontal synchronizing of overlaid digital graphic and video image displays on cathode-ray-tube screens and the like that admirably obviates the prior art disadvantages above described.

A further object is to provide a novel separated integrating phase error zero tracking function and phase loop locking function phase lock circuit with switching control thereof and of more general applicability as well.

Other and additional objects will be explained hereinafter and have been described above, and will be more particularly delineated in the appended claims.

In summary, however, from one of its aspects in the context of the overlaid graphic and video display application, the invention includes a method of horizontal synchronizing of overlayed digital graphic image information and video image information in the same display area of a cathode-ray-tube monitor screen, that comprises: applying phase error voltage signals along a pair of independently operative paths, one integrating the phase error voltage to obtain zero tracking error and the other serving phase loop locking functions; summing the output of both paths for control of the clocking of the graphic image information; and controlling the separate operation of the paths in accordance with display signal aberrations, maintaining the phase lock loop operative in response to the phase error signals during the aberrations while disconnecting the integrating path from such phase error signals during the aberrant period. Preferred and best mode embodiments and details are hereinafter presented.

Figure 2:
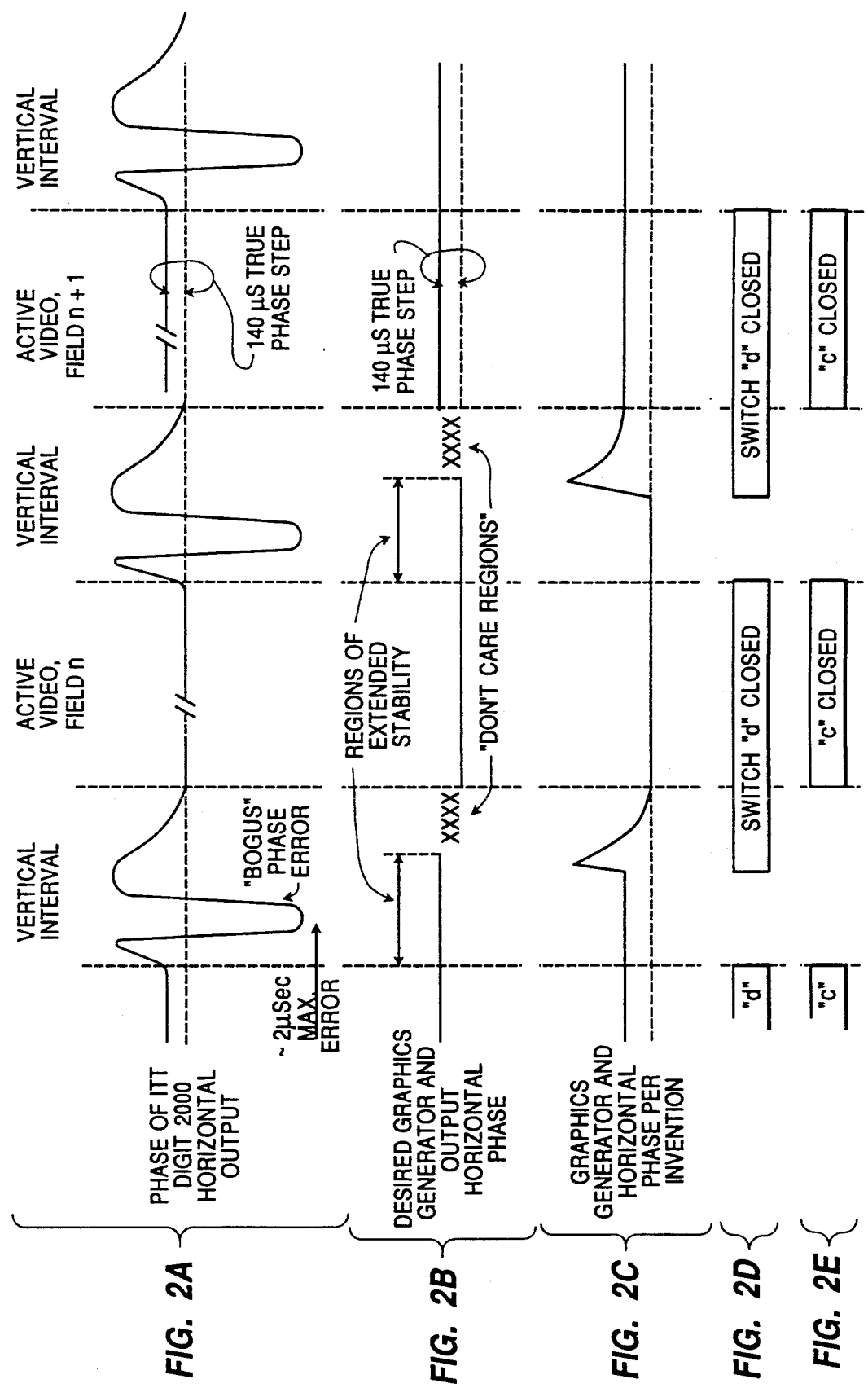
Figure 3:
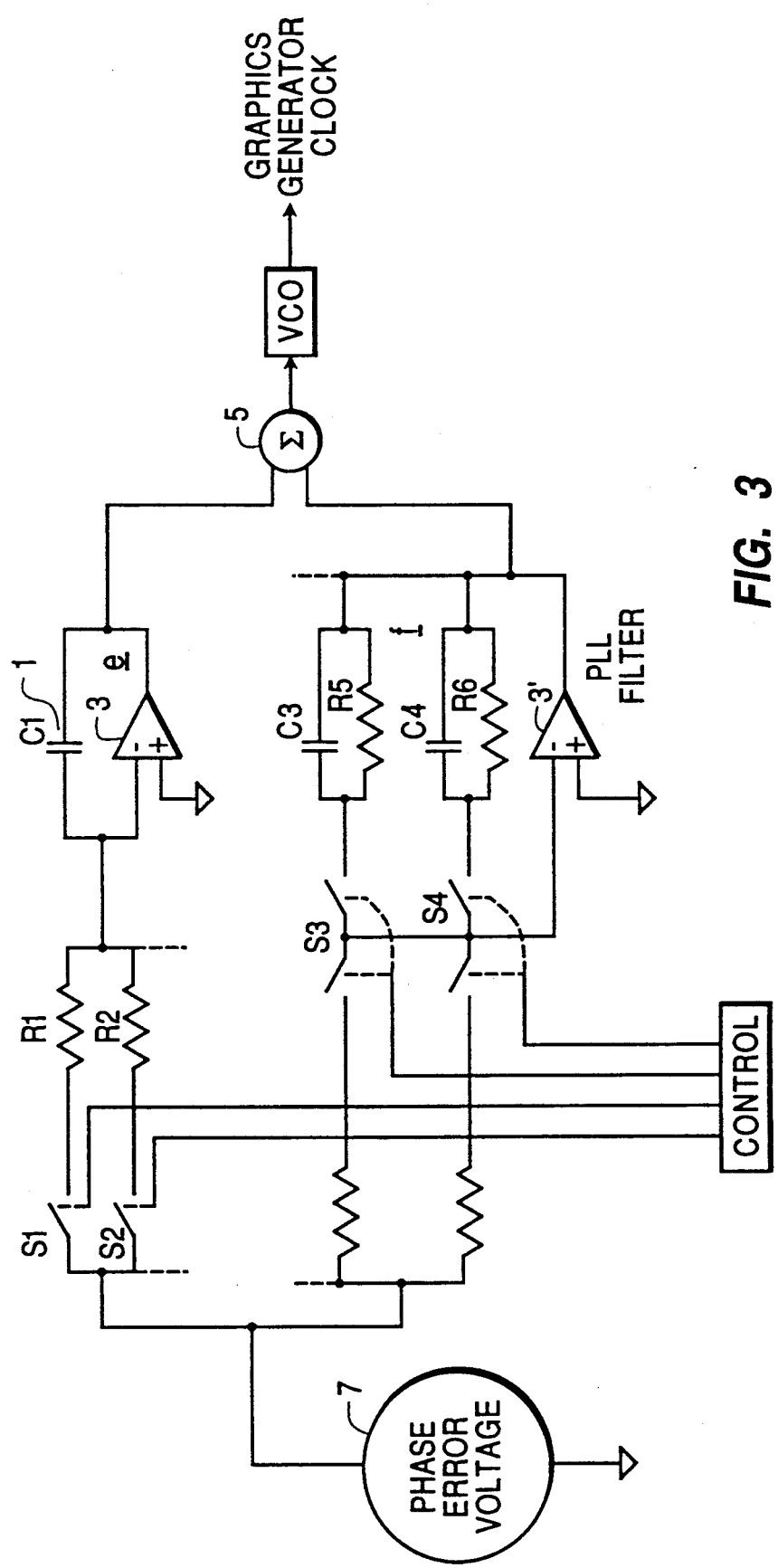

The invention will now be illustrated with reference to the accompanying drawings, FIG. 1 of which is a schematic circuit diagram of a preferred form operating in accordance with the technique or method of the invention;

FIG. 2 presents a series of waveform diagrams, A through C, and operational time blocks D and E illustrative of the timing and operation of the circuit of FIG. 1; and FIG. 3 is a diagram similar to FIG. 1 of a modification.

Referring to FIG. 1, the integrating filter network part or section of the phase lock control network is shown at e, comprising capacitor 1 paralelled by operational amplifier 3, and the separate phase lock loop PLL filter network section with its resistance-capacitance network 2 and operational amplifer 3' is shown at f, the two filter sections being connected to a summer 5 that in turn feeds the voltage-controlled oscillator VCO, and ultimately the digital graphics generator timing clock. The components 2 and the series resistor h of the PLL filter section f determine the time constant and gain for the fast phase response of the phase lock loop: whereas components 1 and series resistor g of the integrating filter section e determine the much longer integrating time constant for the zero tracking error.

The operations of these two sections are controlled by the later-described switches a–d, and the phase error is developed by a phase detector represented by the phase error voltage source 7 and in the appropriate polarity to take into account the sensitivity of the VCO and the inverting character of the filters used.

Turning now to FIG. 2, the typically available signal source is shown at FIG. 2-A in the form of the horizontal synchronization signal on or separated from the video source, being a reasonable approximation of what comes out of the ITT Digit 2000 series chips for their horizontal output phase. The sequence of two successive fields of video is illustrated with most of the stable scan lines omitted, as indicated by the break or dagger marks, and primarily the area around the vertical interval is expanded for better clarity. As is observable, during the first half of the vertical interval, the chips put out a large excursion and phase, up to a couple of microseconds in amplitude, primarily because they are confused by the widths and phases and polarities of equalization pulses. There is a recovery period during the second half of the vertical interval which is just completing to an acceptable state at the time active video begins in the time slot labelled "Active Video". The particular signal illustrated here in FIG. 2-A is one generated by still frame operation from a video disc player, as before described. In addition to this undesirable phase aberration or gyration, which does not represent a change in phase which it is desired to follow, there is the small phase step of 140 nanoseconds, illustrated and labelled towards the right of FIG. 2-A, which does represent a true shift in the phase of both the incoming horizontal and the video travelling with it and must be accommodated by similar shifts in the overlay digital and the operation of the monitor. The switches c and d of FIG. 1 have the time sequence of operation as illustrated in FIGS. 2-D and E, where the time intervals during closure of the respective switches are illustrated and will later be described.

In FIG. 2-B there is shown the desired output to be acheived in terms of the phase with which the graphics generator is operated and the phase with which the monitor is to be operated. As indicated, there is some very short period of time when no video of any kind is to be displayed, videographics or otherwise, prior to the commencement of active video, and this is labelled "don't care" region in which there is no precision requirement during that time. These are the areas of the inescapable region in time when the monitor must be doing vertical retrace and during which period of time there is no concern as to the phase of the output since it is impossible to be presenting video. During the rest of the time, however, a stable phase is required that represents either the correct phase for the even fields ("field n") or the correct phase for the odd fields ("field n+1"), depending upon which of the 140 nanosecond steps is involved. The same circuitry, of course, handles continuous motion at which the 140 nanosecond step is not present.

Returning now to FIG. 1 and the operation of the circuit by opening the switch e, as indicated on time line FIG. 2-E, during the entirety of the vertical interval, the long time constant represented by components g and e is not excited by the excursions which occur during the vertical interval, allowing the very quick response time of the components represented by h and f to settle quickly enough. By switching switch d as indicated in FIG. 2-D, for the beginning of active video, this tracks down the decaying curve of the phase error and acquires accurately the presence or absence of the 140 nanosecond shift by the time the active video starts. If switch d were operated in synchronism with switch c, however, that would not be the case and there would still be a flagging visible in the still frame with unacceptable flutter at the top of the screen. While switch d could be left closed all the time, the large excursions of the vertical interval could create some difficulties with the monitor settling response. Suitable time constant values for the integrating section e for the above purposes have been found to be of the order of 10 milliseconds; and for the phase lock loop network f, of the order of 10 microseconds.

As before explained, an additional advantage of separating the filter into two separate network sections is that fast acquisition after an abrupt change in desired frequency can be achieved by operating switches a or b, FIG. 1, depending on whether it is desired to speed up or slow down the frequency of the loop. The operational amp will deliver current i of section e at the maximum advisable rate determined both by current source capability and by problems with possible overshoot of the final frequency, but at a much higher rate than would normally be the case for passive settling.

The graphics generator is programmed to produce one graphics horizontal sync pulse for every "N" cycles of the graphics generator clock. Since the graphics horizontal frequency is to remain constant, matching that of the video, any change in the value of this "N" indicates an abrupt shift in desired operating frequency of the graphics generator clock. If the change is small enough, the loop will hold lock, but with a substantial intitial tracking error (i.e., phase offset of the horizontal sync pulses.) preceded by a brief initial frequency error. If the change is large (more than about 10%, in one embodiment), the loop will lose lock, accompanied by period of frequency error protracted until lock is re-established.

In the invention, the required frequency transition is detected by the appearance of either phase or frequency errors in excess of certain predetermined minimums. This triggers a cycle of operation known here as "slew mode". During slew, the appropriate current source is switched in as indicated by the initial direction of frequency error. The integrator then slews towards the point of zero tracking error. Since the phase error system (lower section f) is constantly active, if the loop is not initially locked, lock is spontaneously re-acquired before the zero tracking point is reached. The first subsequent reversal in direction of phase error then provides a reliable indication that the zero tracking point has just been reached on capacitor 1 of section e. At this time slew mode terminates, the current source or sink is disconnected, and the integrator returns to a proportional mode of operation. The invention with the split or separate integrating functions of section e for attaining zero tracking error and phase lock loop functions of section f thus also provides the advantage of the very fast slew to accurate overlay of the new frequency.

Referring to FIG. 3, during this slew it may be advantageous to provide a different set of loop components in the lower phase filter section f so as to acquire faster initial lock. In addition, there are other circumstances under which it may be desired to operate the whole system with different dynamic characteristics so that the circuit may be operating with one set of components when achieving fast lock, a second set of components during normal operation. During special conditions, moreover, such as maintaining synchronization during the turn-on of the disc player when the stability of the horizontal coming from the player is particularly poor, operation with yet another set of components may be desired.

Operation with a particularly fast settling time is desirable to set horizontal position just before the start of active video (i.e. while "d" is closed and "c" is open, FIG. 2). Another set of components giving slower response and better noise filtration may, however, be desired during the time of active video (same as internal with "c" closed).

FIG. 3 is intended to illustrate multiple, shown as two, possible sections ($C_3$-$R_5$, $C_4$-$R_6$, etc.) operated by switches $S_3$ and $S_4$. Additional dynamic choices may be required for different integrating times in the upper integrator section which is achieved by selecting a different resistor for the integrating time constant ($R_1$ or $R_2$, etc.) by switches $S_1$ and $S_2$. It should be noted that the choice of components topology here causes no aberrations during switching from one mode to another inasmuch as the voltage on the capacitor 1 ($C_1$) remains the same for the integrator since the switching is of the resistors $R_1$, $R_2$ rather than the capacitor as in the PLL lower section f. The unused sections spontaneously discharge any residual to zero volts across the combination, such as $C_3$-$R_5$ or $C_4$-$R_6$, and this also represents the equilibrium operating point when the system is stable so that mode switching won't introduce a transient.

Further modifications will occur to those skilled in this art, and such are considered to fall within the spirit and scope of the invention as defined in the appended claims.

What is claimed is:

1. A method of horizontal sychronizing of overlayed digital graphic image information and video image information in the same display area of a cathode-ray-tube monitor screen, that comprises, applying phase error voltage signals along a pair of independently operative paths, one integrating the phase error voltage to obtain zero tracking error and the other serving phase loop locking functions; summing the output of both paths for control of the clocking of the graphic image information; and controlling the separate operation of the paths in accordance with display signal aberrations, maintaining the phase lock loop operative in response to the phase error signals during the aberrations while disconnecting the integrating path from such phase error signals during such aberrations, and varying the time constants of one or both of said paths.

2. A method as claimed in claim 1 and in which said aberrations occur during the equalization pulses of the vertical frame and when no video information is to be displayed.

3. A method as claimed in claim 2 and in which said graphic image information is applied as a still frame overlaying the video display and said disconnecting and reconnecting of the integrating path obviates flutter at the top of the overlayed display.

4. In an integrating-phase lock loop circuit for horizontal synchronizing of overlayed digital graphic image information and video image information in the display area of a cathode-ray-tube monitor, a pair of independently operative filter sections, one provided with network means for integrating phase error voltage signals to obtain zero tracking error and the other provided with network means for phase loop locking functions; switching means for selectively and independently connecting each of the filter sections to and disconnecting the same from a source of phase error voltage representing horizontal synchronizing phase errors between the video and graphic image information; means for summing the outputs of the filter sections; and means for applying the sum outputs to voltage controlled oscillator means for controlling the clocking of the graphic image information.

5. An integrating-phase lock loop circuit as claimed in claim 4 and in which said switching means are controlled in accordance with desired graphic display information.

6. An integrating-phase lock loop circuit as claimed in claim 4 and in which means is provided forcontrolling the said switching means to maintain the phase lock loop filter section operative in response to phase error signals during such periods as display signal aberrations, and circuit and vertical scan interval aberrations, to effect phase locking while disconnecting the integrating filter section from said phase error signals.

7. An integrating-phase lock loop circuit as claimed in claim 4 and in which means is provided for varying the time constant of the phase lock loop section to enable faster operation during such aberrations.

8. An integrating-phase lock loop circuit as claimed in claim 4 and in which means is provided for selectively varying the time constants of one or both of said filter sections.

9. An integrating-phase lock loop circuit as claimed in claim 4 and in which the integrating network means normally operates in a proportional mode until said phase error or a frequency error exceeds predetermined minimum values, whereupon means is provided for switching in current source means to cause the integrating network means to slew towards the point of zero tracking error while lock is re-acquired during the continued operation of the phase loop locking network means and with the first subsequent reversal in direction of phase error providing an indication that such zero tracking point has been reached; and means further being provided for thereupon terminating the slewing and restoring the integrating network to operation in said proportional mode of operation.

10. A method of horizontal sychronizing of overlayed digital graphic image information and video image information in the same display area of a cathode-ray-tube monitor screen, that comprises, applying phase error voltage signals along a pair of independently operative paths, one integrating the phase error voltage to obtain zero tracking error and the other serving phase loop locking functions; summing the output of both paths for control of the clocking of the graphic image information; and controlling the separate operation of the paths in accordance with display signal aberrations, maintaining the phase lock loop operative in response to the phase error signals during the aberrations while disconnecting the integrating path from such phase error signals during such aberrations, and in which the integrating normally operates in a proportional mode until said phase error or a frequency error exceeds predetermined minimum values, whereupon the integrating commences slewing towards the point of zero tracking error while lock is re-acquired during continued operation of the phase loop locking, with the first subsequent reversal in direction of phase error providing an indication that such zero tracking point has been reached, whereupon the slewing terminates and the integrating returns to said proportional mode of operation.

* * * * *